F. HANK.
RESILIENT WHEEL.
APPLICATION FILED MAY 7, 1909.
964,249.
Patented July 12, 1910.
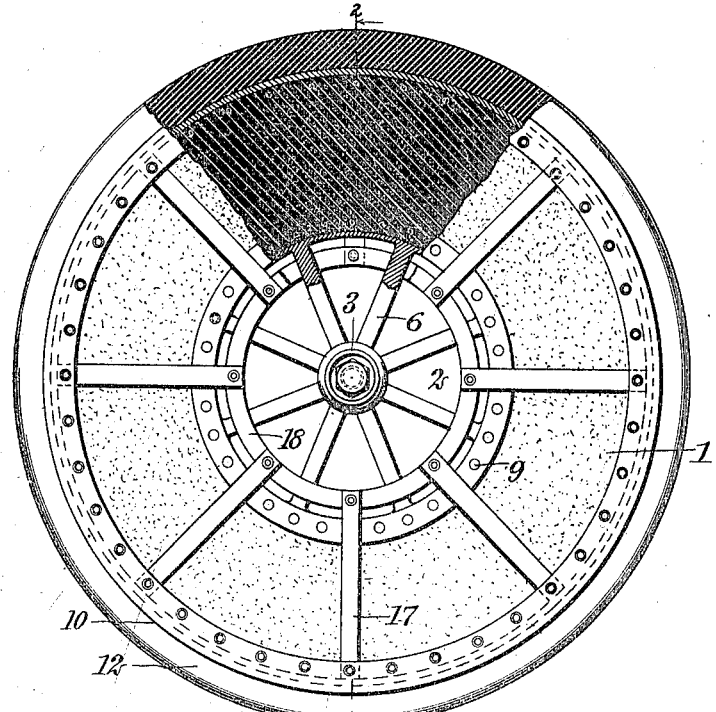
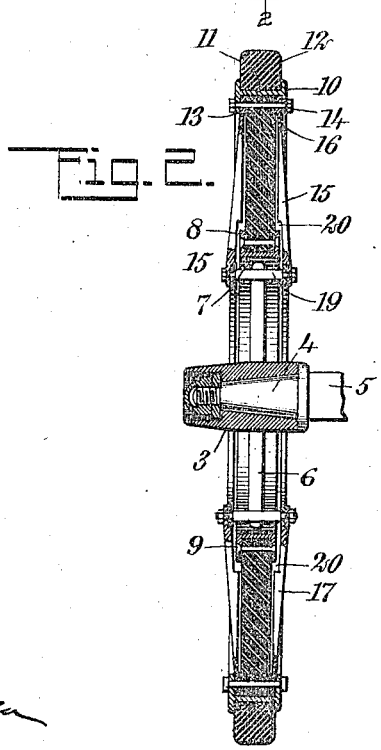
WITNESSES
INVENTOR
Frank Hank
BY

UNITED STATES PATENT OFFICE.

FRANK HANK, OF NEW YORK, N. Y.

RESILIENT WHEEL.

964,249.

Specification of Letters Patent.   Patented July 12, 1910.

Application filed May 7, 1909. Serial No. 494,647.

*To all whom it may concern:*

Be it known that I, FRANK HANK, a subject of the German Emperor, and a resident of the city of New York, borough of Manhattan, in the county and State of New York, have invented a new and Improved Resilient Wheel, of which the following is a full, clear, and exact description.

This invention relates to vehicle wheels such as used on automobiles, carriages, or similar vehicles.

The object of the invention is to produce a wheel which will have great resiliency and durability without embodying in its construction a pneumatic tire.

In its general construction the wheel comprises a disk or body of resilient material attached to a rigid frame and having a central opening in which the hub is attached.

The invention consists in the construction and combination of parts to be more fully described hereinafter and particularly set forth in the claim.

Reference is to be had to the accompanying drawings forming a part of this specification, in which similar characters of reference indicate corresponding parts in both the figures.

Figure 1 is a side elevation and partial section of a wheel constructed according to my invention; and Fig. 2 is a vertical section through the wheel taken on the line 2—2 of Fig. 1.

Referring more particularly to the parts, 1 represents the body of the wheel which is in the form of an annular disk formed of rubber or similar resilient material. In the central opening of this body, the wheel center 2 is mounted. This center consists of a hub 3 which is adapted to receive the arm 4 of an axle 5, as indicated in Fig. 2. From the hub 3 spokes 6 radiate, and these spokes are rigid with an inner rim 7, which rim is of channel form so that it presents flanges 8 on each side, as indicated in Fig. 2, and between these flanges the inner edge of the body 1 is received, as shown. The body is secured to the center by means of bolts or rivets 9 which pass through the flanges 8, as indicated most clearly in Fig. 2. The wheel comprises also a rim 10 of light metal or similar material, presenting a channel 11 on its outer side which receives a tire 12 of solid rubber or similar material. The rim 10 has inwardly projecting flanges 13 at its sides, and between these flanges the outer edge of the disk or body 1 is received. The rim is attached to the disk or body by through bolts 14 which pass through the flanges 13, as indicated. These bolts 14 also secure in position two spiders 15 which are placed on opposite sides of the wheel. Each of these spiders comprises an outer ring 16, and these rings are disposed against the inner sides of the flanges and through them the bolts 14 pass, as indicated in Fig. 2. These spiders 15 have radially disposed arms 17 which extend in toward the central axis of the wheel, and they project beyond the inner rim 7. Their ends are all attached to two hub rings 18 which are arranged respectively on opposite sides of the wheel. These hub rings are connected by heavy stud bolts 19 which pass through the central opening of the wheel and maintain the inner rings a proper distance apart, as shown.

As indicated in Fig. 2, the arms 17 preferably taper slightly toward their outer ends and their inner faces are provided with recesses 20 at the location of the flanges 8. The inner faces of these arms 17 are flat and lie close against the side faces of the body 1. They operate as stays or braces to prevent the lower portion of the wheel, which may tend to be in a state of compression, from bulging laterally. They also operate to hold the inner or central part of the body in the same plane with the rim of the wheel and prevent the hub from shifting laterally out of this plane.

With a wheel constructed in this way a shock will be absorbed as though the wheel were pneumatic, and thus reduce the amount of power necessary to drive the vehicle.

Having thus described my invention I claim as new and desire to secure by Letters Patent,—

A wheel having an annular body of resilient material, in the form of a disk, an outer rim attached to the outer edge of the said body, a hub concentric with said disk, and two annular members concentric with said hub, the outer of said members being attached to the inner edge of said body and having spokes connecting it with said hub, and the inner of said members having radially-disposed arms in engagement with the side faces of said resilient body to brace the same against lateral displacement, and connected at their outer ends to said outer rim.

In testimony whereof I have signed my name to this specification in the presence of two subscribing witnesses.

FRANK HANK.

Witnesses:
F. D. AMMEN,
PHILIP D. ROLLHAUS.